INVENTOR.
BERT K. BRANDT

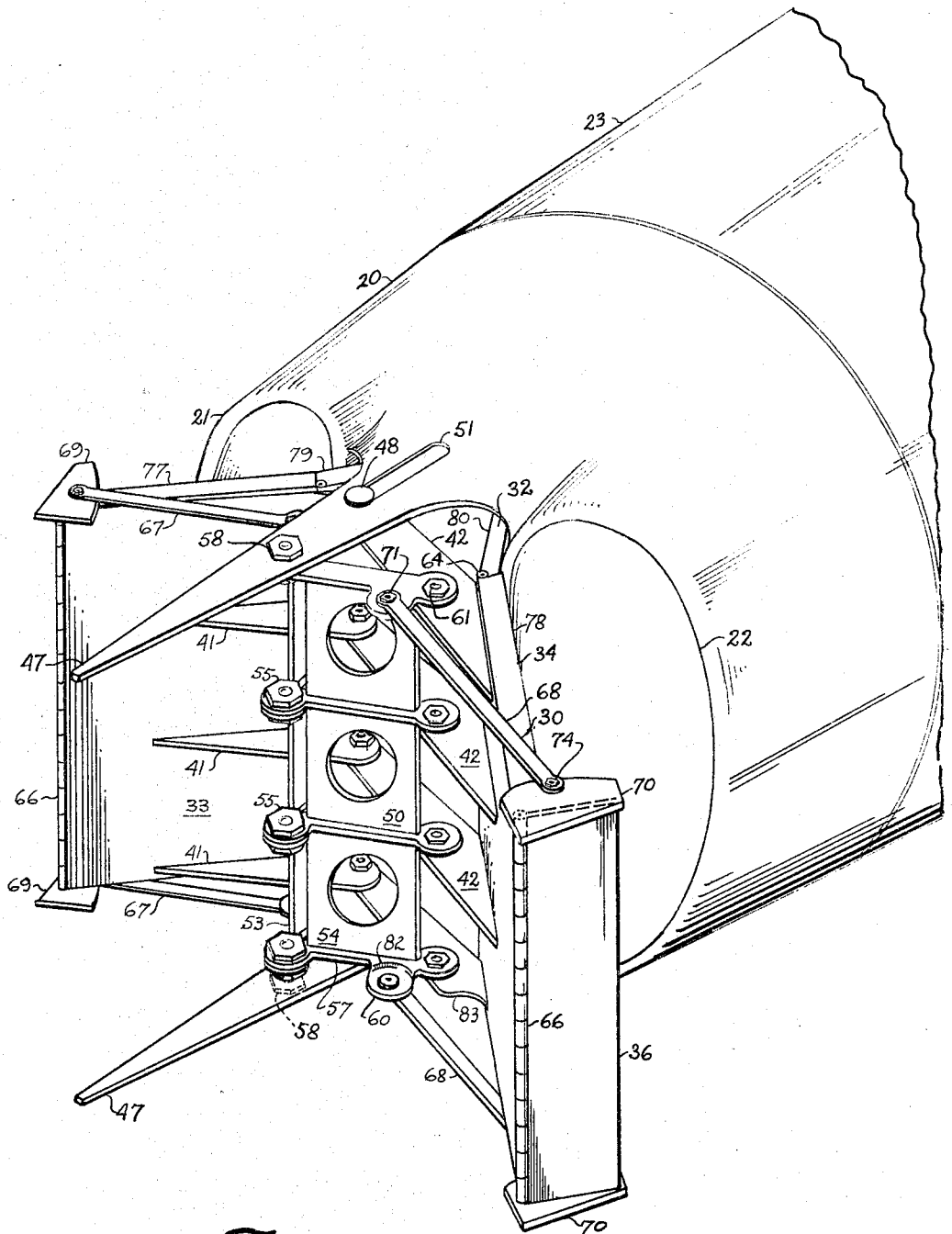

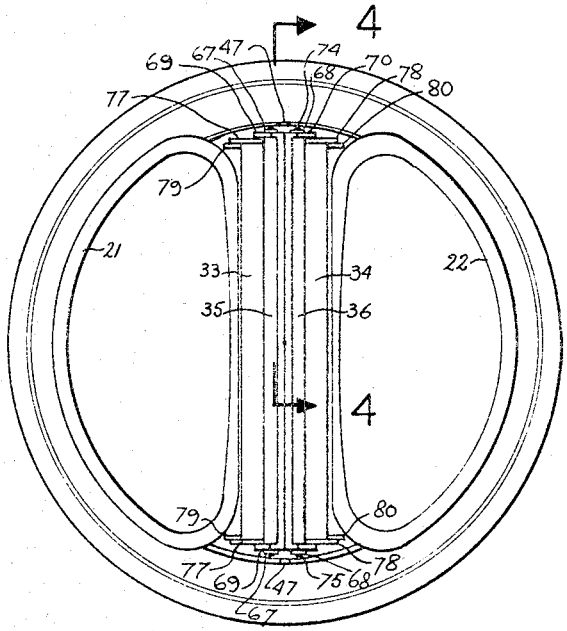
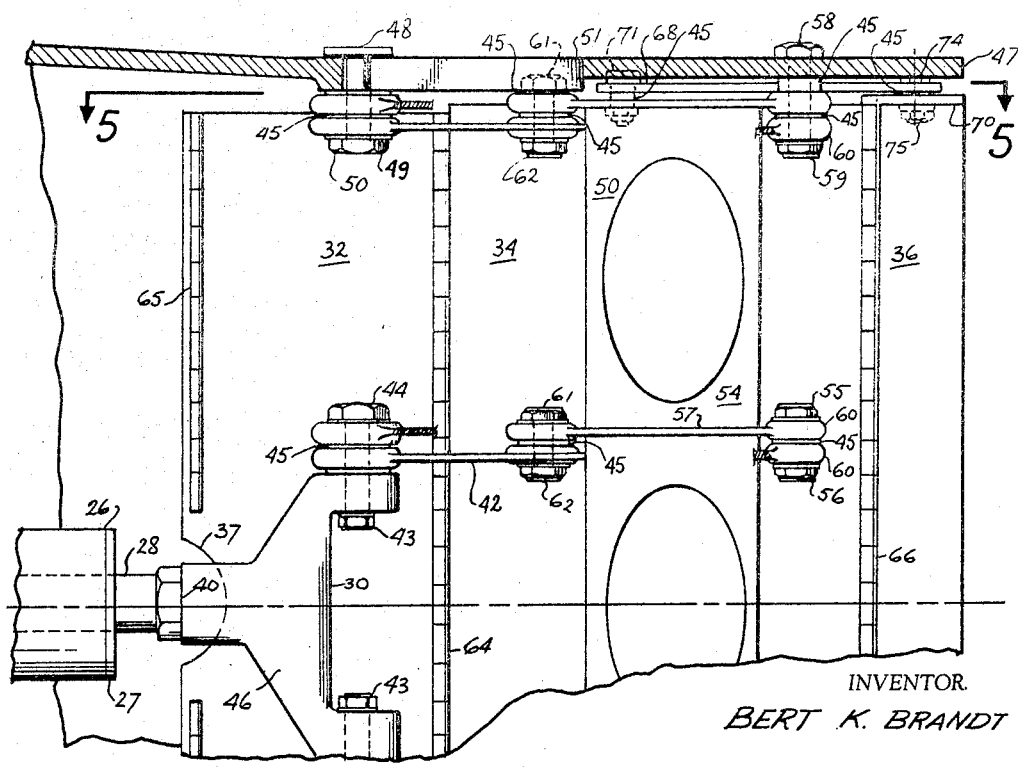

INVENTOR.
BERT K. BRANDT

INVENTOR.
BERT K. BRANDT

3,276,696
JET ENGINE THRUST MODIFICATION
Bert K. Brandt, 1230 Lake St. S., Renton, Wash.
Filed Aug. 21, 1962, Ser. No. 218,414
5 Claims. (Cl. 239—265.37)

This invention relates to the directional control of fluids discharged from nozzles and more particularly to the directional control of exhaust fluids discharged from jet power plants and consequently to the control of jet power plant thrust used to move vehicles of all types.

The purpose of this invention is to provide a thrust directional control apparatus which can be operated at any time without reference to the power setting of a jet thrust producing power plant to give an operator precise control over a vehicle propelled by such a power plant.

An object of this invention is to provide a thrust directional control device which can be utilized with one or more power plants discharging through one or more nozzles, without necessitating initial or subsequent major modifications to the power plant, and with minimum effect on the operating efficiency of the power plants.

An object of this invention is to provide a thrust directional control means which moves from a non-blockage contoured position at the exhaust fluid pattern center of one or more nozzles into selective variable blockage contoured positions to redirect the exhaust fluids for vehicle control purposes.

An object of this invention is to provide a thrust directional control device which is reliable throughout all vehicle maneuvers, and if the actuation energy applied to move the control device should fail, the structures of the control device causing directional changes will be realigned with the major flow axes of the power plant nozzles upon impingement of the discharging fluids.

Many other known purposes and objects set forth in the prior art are also included. All of these purposes and objects and particularly those stated, are directed to making the jet engine extremely universal as a power plant for many vehicles. In order that quick maneuvers can be made without incurring the delays in thrust buildup as the jet engines gain speed, this invention more than others makes a change in thrust direction possible without necessarily changing the jet engine's internal speed, i.e., revolutions per minute. The selective, incremental or large and rapid movement of the thrust modifying apparatus itself bears a direct relationship to the attainment of close control over the entire motion of the vehicle. This advantage establishes the importance of the invention when installed at the rear of power plants serving as main propulsion means of jet powered vehicles for travel on land, in air, and on and below water, whether the fluid discharged by the power plant be a gas, liquid or mixture of gas and liquid.

The invention, for the purposes of illustration, is shown in embodiments serving to modify the directional path of fluid leaving the main propulsion power plants of jet aircraft. The pilots of such aircraft at all times have much more precise control of direction, acceleration and velocity of airplanes equipped with the invention than they would have if only a thrust reverser limited to only two positions, one of complete interference, i.e., reverse thrust, and the other of non-interference, i.e., forward thrust, were used for control, and probably, unlike this invention, were necessarily limited to utilization only during ground maneuvers.

The purpose and the objects of this invention will become more apparent as the following description is read and references are made to the drawings, wherein:

FIGURE 2 is a perspective view similar to FIGURE 1 showing, however, the thrust modifying assembly in a thrust reversal, i.e., maximum redirective, position in the exhaust fluid streams;

FIGURE 3 is a rear view of the thrust modifying assembly shown in FIGURES 1 and 2;

FIGURE 4 is a vertical partial sectional view of the thrust modifying assembly taken on line 4—4 of FIGURE 3;

Figure 1:
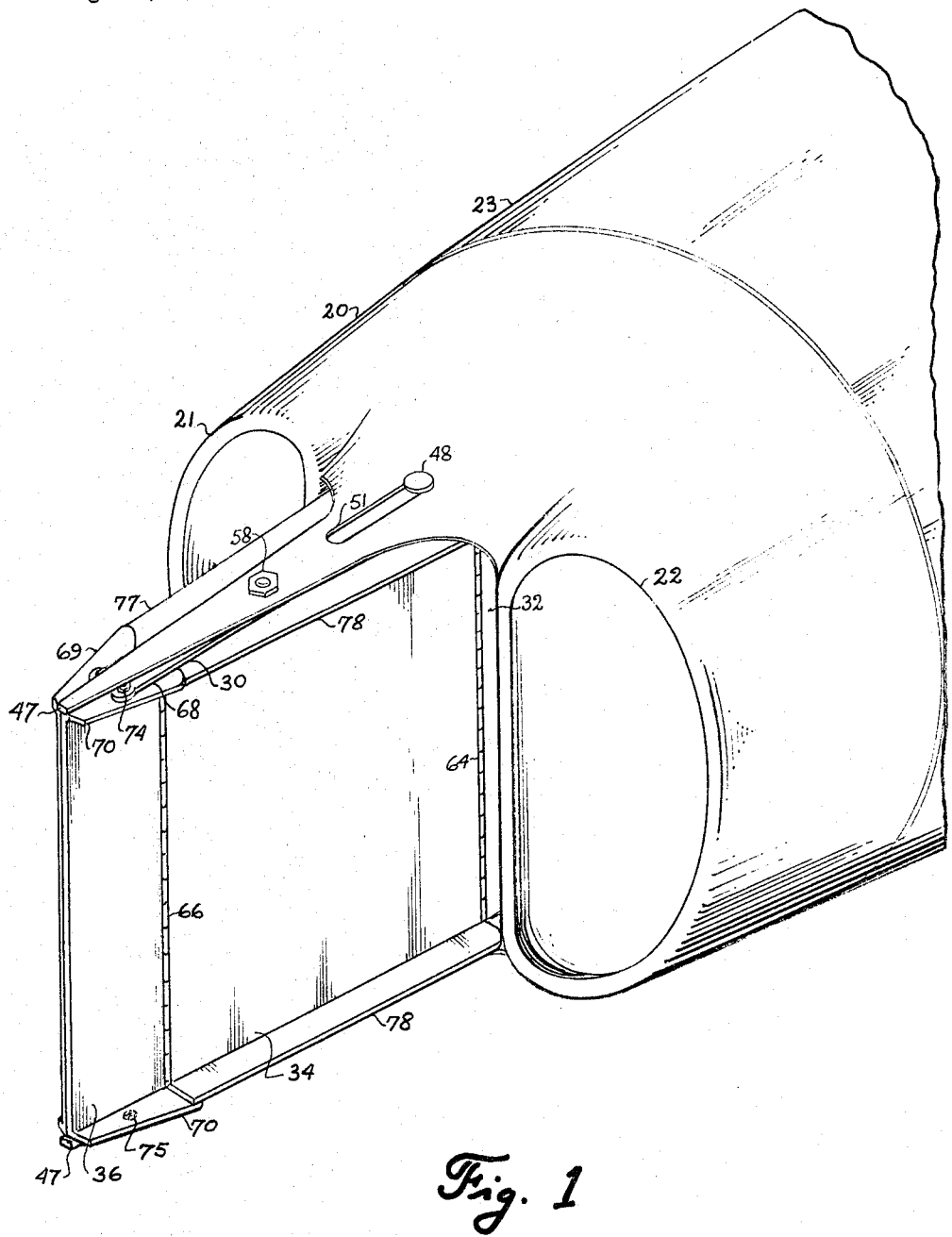
FIGURE 1 is a perspective view of a preferred embodiment of the thrust-modifying assembly mounted at the rear of a turbo-jet engine having multiple exhaust exits; the assembly being shown in its forward thrust, i.e., inactive position substantially clear of the exhaust fluid streams.

In these figures two embodiments of the thrust-modifying assembly are shown in their relationship to exhaust nozzles of jet producing power plants. In both embodiments, selective movement of the assembly throughout various positions from an inactive position shown in FIGURE 1 to a most active position shown in FIGURE 2, results in precise directional control of thrust produced by the jet power plant. Such control of thrust results in the excellent control of any vehicle moved by the thrust produced by the jet power plant.

This thrust modifying assembly of static and dynamic components operates reliably and substantially within the outer boundary of the entire jet exhaust pattern produced by one jet power plant or one group of jet power plants (not shown) discharging exhaust fluids through one or more nozzles.

Throughout FIGURES 1 through 7, the preferred embodiment of the flying assembly 20 is shown located between and at the rear of two slightly separated side-by-side nozzles 21 and 22 which discharge the exhaust fluids leaving the jet engine 23. In this relative location or any arrangement similar to it, the thrust modifying assembly 20 when in its non-interference, forward thrust position of FIGURES 1, 3, 4 and 5 is substantially out of the exhaust fluid streams.

Figure 8:
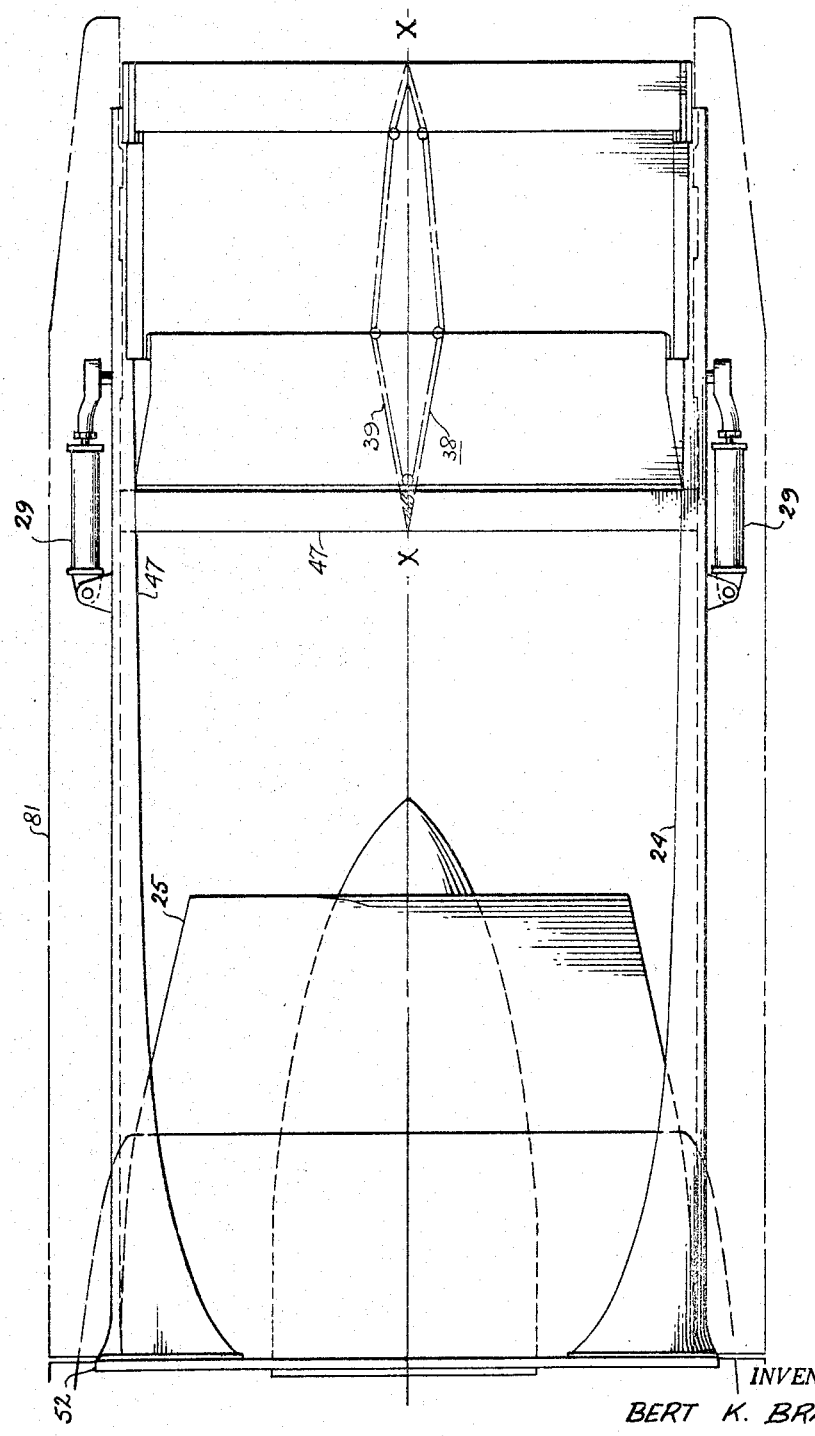
FIGURE 8 is a side view of the second embodiment of the thrust modifying assembly, in its forward thrust position, mounted at the rear of a turbojet engine having one exhaust exit, the thrust modifying assembly being mounted (not shown) independently of the single exhaust nozzle.

In FIGURE 8, however, the second embodiment of the thrust modifying assembly 24 is located within the exhaust fluid path at all times as the fluid leaves the larger single nozzle 25. When the fluids are exhaust gases, the continuous exposure to possibly very high exhaust gas temperatures may necessitate the use of different materials and/or more frequent replacements of parts. Yet when all design considerations are weighed with respect to costs and performance, this exposed assembly 24 may prove to be the most expedient when jet power plants with the assembly are installed permanently or temporarily on certain vehicles (not shown).

The thrust modifying assemblies 20 or 24, whether adapted for location, either between exhaust nozzles 21 and 22 or directly behind a large nozzle 25, in its limited or non-interference position of FIGURES 1, 3, 4, 5 and 8, is very thin in its inactive profile, as indicated in FIGURE 8 by the dotted (rotated) cross section, X—X. In the embodiments illustrated, the assemblies 20 or 24 have some thickness solely to accommodate the linkage arrangement 30 which expands essentially laterally when moved by one or more actuators 26 such as the hydraulic actuator cylinder 27 piston 28 combination, or by other means, pneumatic, electrical or otherwise (not shown) governed by controls (not shown).

Throughout the actuation range of the linkage arrangement 30 starting from the inactive position, the profile of the thrust modifying assemblies 20, 24 is changed selectively gradually and/or abruptly to positions of greater interference. The objective at all times is to have the profile effective in redirecting the exhaust fluids as accurately as possible in a substantially efficient flow pattern. To accomplish this, the assemblies 20 or 24 have at least six panels arranged in three pairs, 31, 32–33, 34–35, 36, with the pairs following one after the other in the exhaust fluid flow and the panels of each pair commencing in the non-interference position almost back-to-back and thereafter gradually separating with the last pair of panels 35, 36, those farthest downstream, being capable of the maximum deflection from one another.

The linkage arrangement 30 is designed, as noted previously, to be essentially confined within the variable space between the six panels. In the first embodiment the forward panels 31 and 32 are formed to provide access 37 required in connecting the linkage arrangement 30 to the actuator 26. In the second embodiment the forward panels 38 and 39 are not formed to provide such an access because two like actuators 29, 29 are used above and below the panels of the assembly.

In both embodiments the actuators forces, whether applied through the single centered actuator 26 or simultaneously through the pair of opposite actuators 29, 29, are applied to overlapping arm extensions 41, 42 of panels 33 and 34, respectively, utilizing hinge-bolt 43, nut 44, and spacer 45 sub assemblies.

In first embodiment in FIGURE 4, the actuator forces of the single actuator 26 are distributed to two pairs of inner arm extensions 41, 42 by the distributing connector 46 positioned by nut 40. Like arm extensions 41 and 42 located near the outer edges of the panels 33 and 34 are connected to the extending frame 47 of the thrust modifying assembly 20 as hinge-guide-bolt 48—nut 49 and spacer 45 sub assemblies indirectly control the movement of panels 33, 34 by confining the guide bolt 48 to sliding movement within the two framing slots 51.

The extending frame 47 through like support structure is positioned by connecting all the framing of a thrust modifying assembly of either embodiment to the standard jet engine nozzle attachment ring 52, as shown in FIGURE 8 only, in illustrating the second embodiment.

The movement of the middle panels 33, 34, beyond the control established by the guiding slots 51, is controlled by the spreaders 53, 54 which also serve as the carrying support for the entire group of panels. The spreaders are essentially vertically positioned single plane web members 50 with cutouts for weight reduction purposes and with transverse webs 57 at spaced locations to provide attachment structure 60. The spreaders at their aft ends are rotatably held together by both hinge bolt 55, nut 56 and spacer 45 sub assemblies and hinge anchoring bolt 58, nut 59 and spacer 45 sub assemblies, the latter which are secured to the extending frame 47. At their forward ends the spreaders 53, 54 are rotatably held in place on the arm extensions 41, 42 of panels 33, 34 by hinge bolt 61, nut 62 and spacer 45 sub assemblies at locations near the respective panels 33, 34. This resulting quadrangle configuration of the arm extensions and spreaders, upon movement of the actuators, 26 or 29 of a respective embodiment, controls the combined translating and pivotal movement of the panels 33 and 34.

The forward panels 31 and 32 are simultaneously in motion with middle panels 33, 34 because the trailing edges of the forward panels are pivotally connected to the leading edges of the middle panels 33 and 34 by like hinge connectors 64, 64. This movement of the forward panels 31 and 32 is also controlled by joining their leading edges with a hinge connector 65 which moves along the center in a fore and aft direction.

The rear panels 35, 36 both translate and pivot more than the other panels and like the forward panels 31, 32, they are also simultaneously in motion with the middle panels 33, 34, because the leading edges of the aft or rear panels 35, 36 are pivotally connected to the trailing edges of the middle panels 33, 34 by like hinge connectors 66, 66. The movement of the rear panels 35, 36 is additionally controlled by connecting rods 67, 68 pivotally connected between the spreaders 53, 54 and pairs of offset end plates 69, 70, secured to the short edges of the rear panels 35, 36. Hinge bolt 71, nut 72, and spacer 45 subassemblies are used to join the connecting rods 67, 68 to the spreaders 53, 54. Also hinge bolt 74, nut 75 and spacer 45 subassemblies are installed to join the connecting rods 67, 68 to the offset end plates 69, 70 secured to the short edges of the rear panels 35, 36.

The spreader 50 is constructed to be interchangeably used on either side. At one location on the spreader 50, at the top when it is used on the left side and at the bottom when it is used on the right side, the attachment structure 60 is offset at 82 to clear the connecting rods 67 and 68 for travel beyond the middle panels 33 and 34. Also the arm extensions 41, 42 of the panels 33 and 34 at these same locations are modified at 83 to provide clearance for hinge bolt 71, nut 72 and spacer 45 subassemblies.

The pairs of offset end plates 69, 70 in addition to serving as anchoring structure for the connecting rods 67, 68 also act as guide vanes performing the fluid flow control dynamic effect referred to in aerodynamics as the airfoil end plate effect. The other panels also are formed with similar flow controlling end plates. Pairs of end plates 77, 78 are on middle panels 33, 34, and pairs of end plates 79, 80 are on forward panels 31, 32.

In operation, when these thrust modifying assemblies are opened the quadrangle like linkage arrangement increases in a lateral dimension and decreases in a longitudinal dimension. The extent of opening is governed by the vehicle operator manipulating cockpit controls (not shown) which cause selected movement of the actuators 26 or 29. The operator without changing the throttle setting of his power plants effectively modifies the directional thrust components to serve his immediate operational purpose by selectively positioning the fluid control panels.

Figure 5:
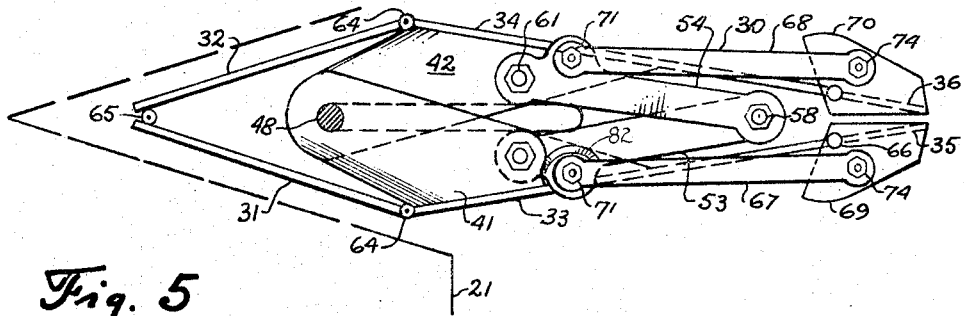
FIGURES 5, 6 and 7 are horizontal section views taken along broken section line 5—5 of FIGURE 4 showing schematically the thrust modifying assembly with some components thereof arranged respectively in forward thrust position in FIGURE 5, partial redirective position in FIGURE 6 and reverse thrust position in FIGURE 7.
Figure 6:
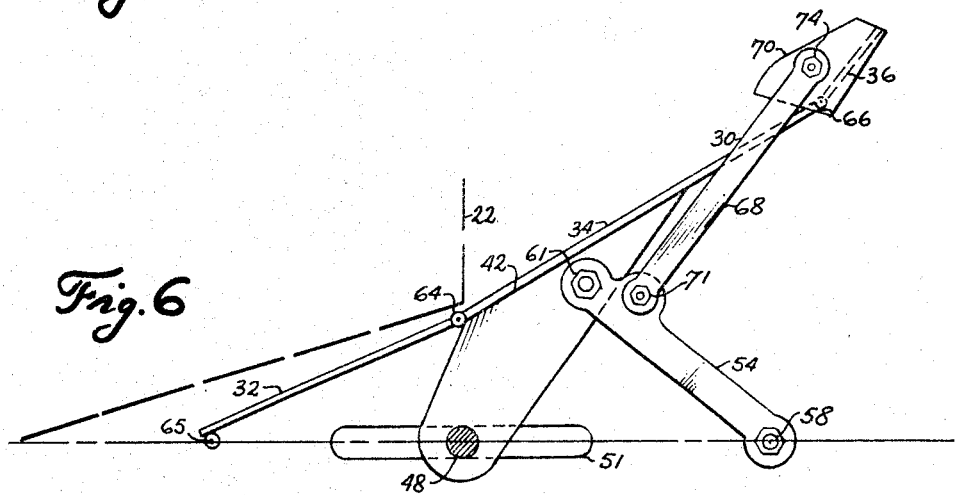
Figure 7:
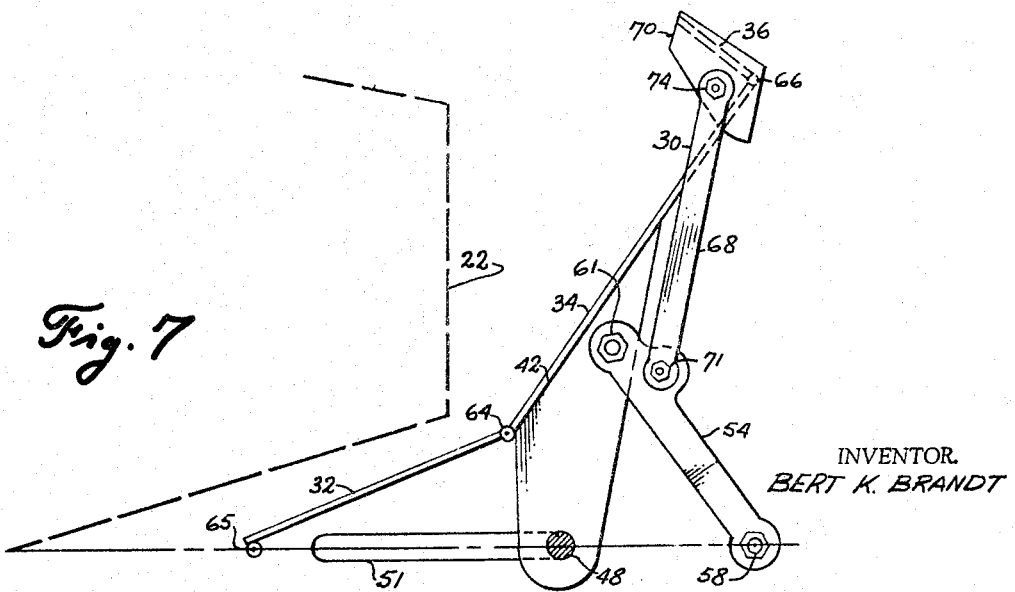

FIGURES 5, 6 and 7 illustrate the thrust modifying range available to an operator. For example, the pilot of a jet plane while in flight and/or on the ground maintains the thrust modifying assembly: in the cruise or substantially non-interference position of FIGURE 5 where the panel assemblies are shown in back-to-back relation when maximum forward thrust is wanted; in the lower speed or partial interference position of FIGURE 6 when reduced forward thrust is wanted; in the reverse or full interference position of FIGURE 7 when reversed thrust is needed; and in other intermediate positions (not shown) when other thrust components are required. Furthermore, the pilot can initiate and follow up any position changes of either embodiment of the thrust modifying assemblies 20 or 24, acting slowly, quickly and/or irregularly to control the direction of the jet power plant thrust. Such control consequently permits the pilot or operator of a jet powered vehicle to control precisely the vehicle's direction and velocity of motion without changing or while changing the jet engine throttle setting.

The embodiment I of the invention illustrated in FIGURES 1 through 7, inclusive, is preferred where the vehicle's operation requires substantial utilization of the thrust modifying assembly over a given normal travel distance and/or period. When precise control should always be available the embodiment I of FIGURES 1 through 7 should be in readiness. Airplanes, for example, flying from restricted length runways and/or making short trips should be equipped with this embodiment.

Although dual nozzles are known to be less efficient than a single nozzle, the efficiency gained by dividing the exhaust flow around the thrust modifying assembly substantially offsets the original divided flow losses. Moreover, the thrust modifying assembly is constructed and operated to better accomplish the operating control objectives.

On certain travel routes there may be little or no need for precise thrust control and the jet engine can be fitted with a standard nozzle following the quick removal of the embodiment I assembly. This assembly is primarily supported by fasteners joining it to the engine nozzle attachment ring 52 and it is interchangeably mounted in place of a standard engine nozzle assembly (not shown).

For other vehicle travels, the embodiment II illustrated in FIGURE 8 may be used. The embodiment II is suitable for quick attachment and removal without necessarily removing the engine nozzle 25 and with limited adjustment of engine cowling 81. This results in a more rapid conversion time in either removing or installing the embodiment II on a vehicle which may have limited need for the precise control made available by the thrust modifying installation. Such a vehicle may be a long range military aircraft operating generally from long air strips. The thrust modifier would only be installed on certain flights, for example, when the military aircraft were to be flown into crowded flight patterns near large cities.

Also various sizes of embodiment II thrust modifiers could be made available as accessories for quick installations on aircraft originally not designed for such thrust modifiers and/or only having limited need for such thrust modifiers. The performance efficiency of the single nozzle will be offset by the thrust modifier assembly drag. However, the better control aspects will oftentimes require the installation of the thrust modifier.

These thrust directional control assemblies are economically manufactured, assembled and installed on all types of jet power plants handling various fluids providing an assembly which is subsequently readily inspected and maintained throughout its service life on any vehicle.

What is claimed is:

1. A jet engine nozzle combined with a means for deflecting and reversing jet thrust comprising structural means for attachment to a jet engine framing, a nozzle means comprising, two similar nozzles spaced from one another but closely arranged and attached to the structural means to receive and to divide the flow of exhaust fluids from the jet engine; and a thrust deflecting and reversal assembly supported by the structural means between the spaced nozzles, the thrust deflecting and reversal assembly comprising multiple exhaust fluid deflecting planar members located initially between the spaced nozzles and expandable from an aligned non blockage planar configuration into selective multiple plane deflecting configuration to redirect the exhaust fluids leaving the nozzles, the multiple thrust deflecting planar members being arranged in like pairs with the first pair nearest the nozzles remaining pivotally joined together on a pivotal axis that remans midway between the nozzles during progressive lateral movements of the remaining opposite portions of the multiple exhaust fluid deflecting planar members.

2. A jet power plant nozzle means equipped with a jet thrust directional control modifying means, comprising: at least two nozzles to receive the exhaust jet flow from at least one power plant, the nozzles having a framing structure supportable on the jet power plant and positioning the nozzles exits slightly apart; a multiple planar panel assembly arranged in two groups of panels commonly pivotally joined at the end adjacent the nozzles and otherwise free to move, all panels having at least one edge pivotally joined to an edge of an adjacent panel, linkage and actuating means movably supporting the multiple planar assembly on the framing structure between the nozzles said assembly extending beyond the nozzle exits in an overall planar configuration when substantially no jet thrust directional control is undertaken and in various multiple plane configuration when selective jet thrust directional control is undertaken, the actuated linkage pivotally moving the planar panel groups apart with each successive rearward planar panel moving through a larger angle than the preceding planar panel.

3. Directional control modifying means of thrust generated by a jet power plant, comprising: at least two nozzles to receive the exhaust jet flow from at least one power plant; a framing structure supportable on the power plant and positioning the nozzles slightly apart; a multiple panel assembly arranged in two groups of panels commonly pivotally joined at the end adjacent the nozzles and otherwise free to move, all panels having at least one edge pivotally joined to an edge of an adjacent panel; linkage and actuating means movably supporting the multiple panel assembly on the framing structure between the nozzles; said assembly extending beyond the nozzle exits in a substantially non-interference configuration when substantialy no jet thrust directional control is undertaken and in various multiple panel configurations when selective jet thrust directional control is undertaken, the actuated linkage pivotally moving the panel groups apart with each successive rearward panel moving through a larger angle than the preceding panel.

4. Directional control modifying means of thrust generated by a jet power plant, comprising: at least two nozzles to receive the exhaust jet flow from at least one power plant; a framing structure for the nozzles adapted for positioning the nozzles slightly apart and to the rear of a jet power plant; a multiple panel assembly arranged in two groups of panels commonly pivotally joined at the end adjacent the nozzles and otherwise free to move, all panels having at least one edge pivotally joined to an edge of an adjacent panel; linkage and actuating means movably supporting the multiple panel assembly on the framing structure between the nozzles; said assembly extending beyond the nozzle exits in a substantially non-interference configuration when substantially no jet thrust directional control is undertaken and in various multiple panel configurations when selective jet thrust directional control is undertaken, the actuated linkage pivotally moving the panel groups apart with each successive rearward panel moving through a larger angle than the preceding panel.

5. Apparatus for selectively directing the stream of exhaust gases issuing from nozzle structure associated with a jet power plant comprising, a pair of articulated multiple panel assemblies, said assemblies being pivotally connected to each other at their leading edges, and each assembly comprising a plurality of essentially planar panels having one edge pivotally connected to the edge of an adjacent panel for swinging movement about substantially parallel axes, means mounting said panel assemblies in side-by-side relation in position to essentially bisect said exhaust gas stream, and linkage means operatively connected to simultaneously swing said assemblies about a common axis provided by the pivot connection at the leading edge of said assemblies between positions in which said panel assemblies are in substantially back-to-back closely adjacent non-interference configuration or in which said panel assemblies are swung apart to intercept and deflect said exhaust gases said linkage being effective to simultaneously swing each panel of each assembly and to move each successive rearward panel through a larger angle than the preceding panel, and said common axis remaining substantially at the center of said exhaust gas stream in all positions of said panel assemblies.

References Cited by the Examiner

UNITED STATES PATENTS

| 2,757,510 | 8/1956 | Holloway | 60—35.54 |
| 2,758,805 | 8/1956 | Graham | 60—35.54 X |
| 2,839,891 | 6/1958 | Drakeley | 60—35.54 |
| 2,979,893 | 4/1961 | Meyer | 60—35.54 |

MARK NEWMAN, *Primary Examiner.*

SAMUEL LEVINE, *Examiner.*

W. A. SCHUETZ, R. D. BLAKESLEE,
*Assistant Examiners.*